Figure 1:
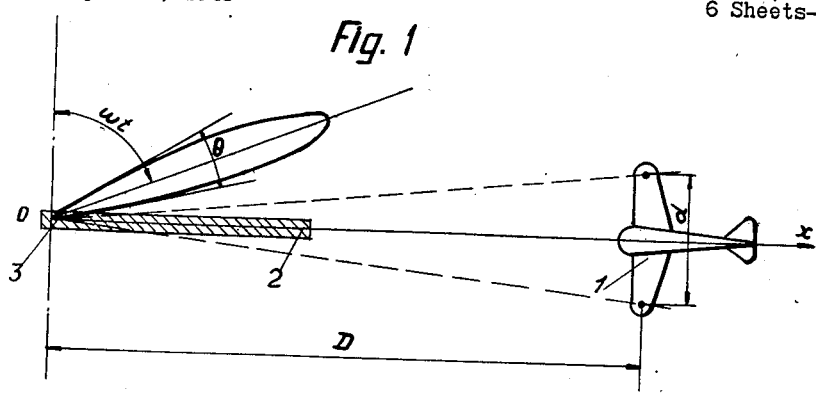

May 4, 1954  J. BOUZITAT ET AL  2,677,821
BLIND LANDING SYSTEM
Filed Sept. 22, 1948  6 Sheets-Sheet 1

Inventors
Jean Bouzitat
Claude M. Ducot and
Pierre Perilhou
by Brown & Seward
Attorneys May 4, 1954

J. BOUZITAT ET AL 2,677,821

BLIND LANDING SYSTEM

Filed Sept. 22, 1948

6 Sheets-Sheet 3

Inventors
Jean Bouzitat
Claude M. Ducot and
Pierre Perilhon by Brown & Seward
Attorneys May 4, 1954

J. BOUZITAT ET AL 2,677,821

BLIND LANDING SYSTEM

Filed Sept. 22, 1948

6 Sheets-Sheet 4

Inventors
Jean Bouzitat
Claude M. Ducot and
Pierre Perillon by Brown & Seward
Attorneys

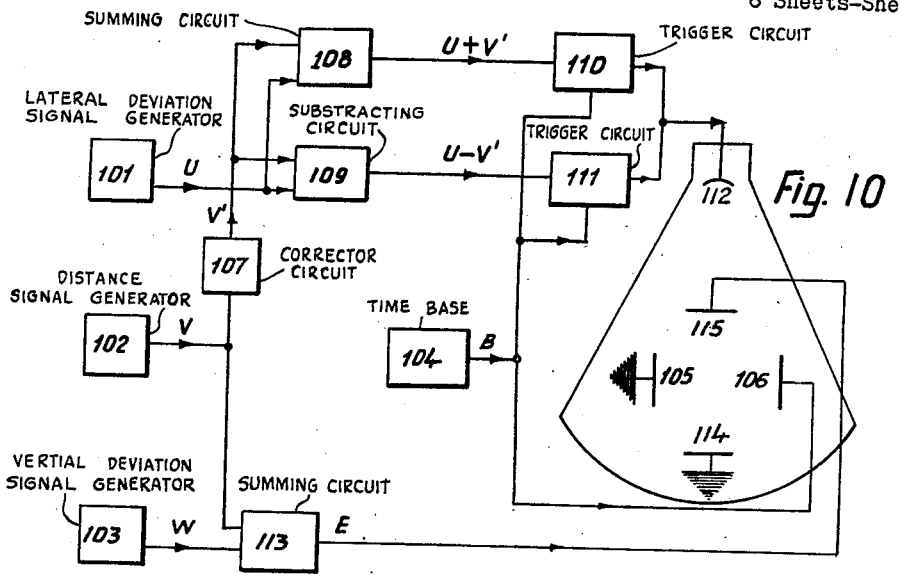
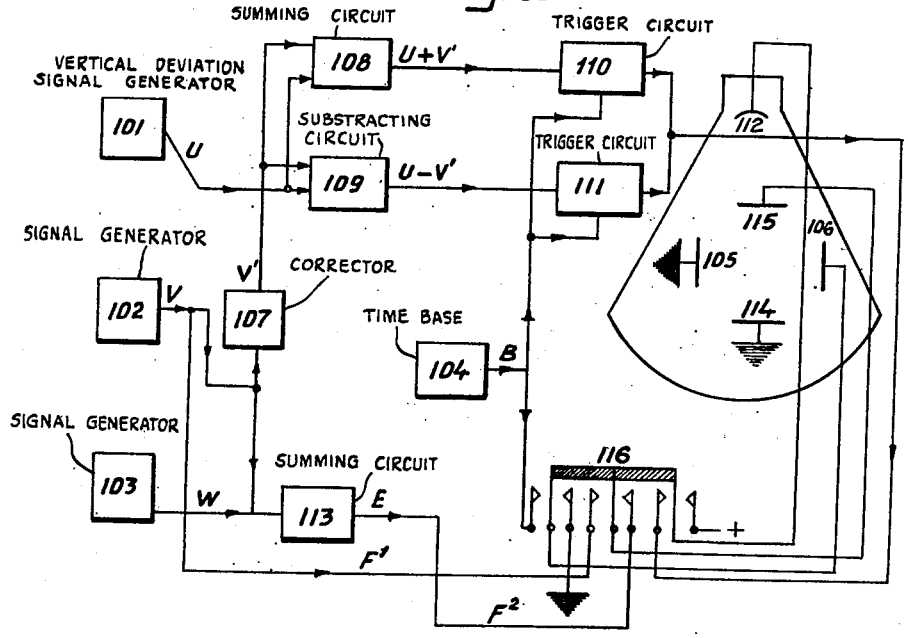

May 4, 1954  J. BOUZITAT ET AL  2,677,821
BLIND LANDING SYSTEM
Filed Sept. 22, 1948  6 Sheets-Sheet 6
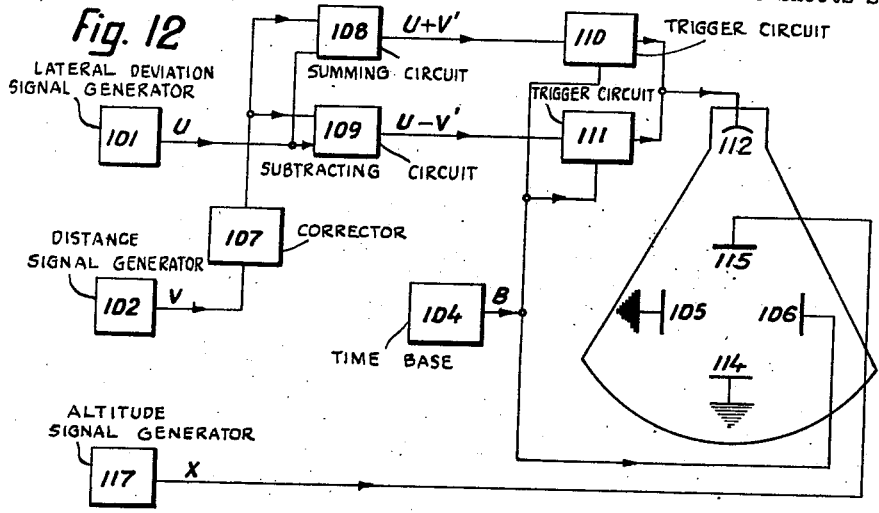
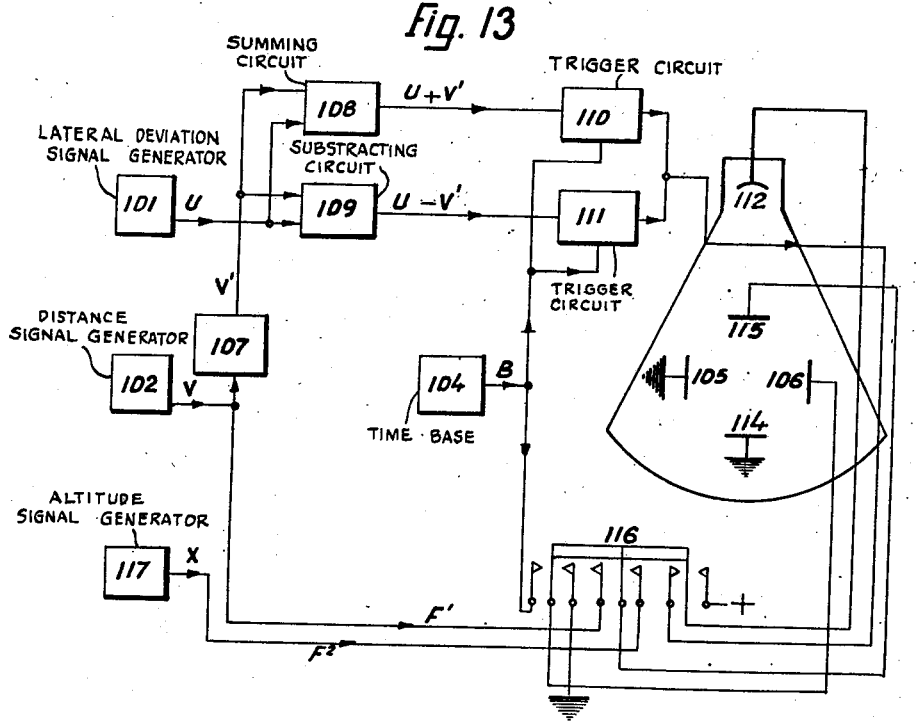

Patented May 4, 1954

2,677,821

UNITED STATES PATENT OFFICE 2,677,821

BLIND LANDING SYSTEM

Jean Bouzitat, Paris, Claude M. Ducot, Neuilly-sur-Seine, and Pierre Perilhou, Clamart, France, assignors to Office National d'Etudes et de Recherches Aeronautiques, Paris, France, a company of France Application September 22, 1948, Serial No. 51,442

Claims priority, application France September 23, 1947

32 Claims. (Cl. 343—108)

This invention relates to the problem of blind landing of aircrafts and concerns more particularly an apparatus or equipment for giving to the pilot the necessary indications of guidance of the craft during such a landing effected with the aid of radio electric means.

A great number of devices has been already devised for the purpose of permitting a blind landing of aircrafts but the known devices of this kind do not fulfil the desired conditions as regards the presentation to a pilot of necessary indications and data, for guiding a craft during such a landing, in a form in which the same can be easily used by the pilot. In fact, it is extremely advantageous to present the indications or data concerning the guiding of a craft during a blind landing so that their perception by the pilot be as much as possible intuitive and so that the pilot by associations of ideas operates the controls in a proper direction by following the reactions which correspond as much as possible to those which he will have naturally.

The present invention has for its object a novel method and means for the indication to a pilot of an aircraft the necessary informations or indications for effecting a blind landing of the craft, said indications or informations being produced in a manner particularly suited for an easy and instantaneous interpretation thereof by the pilot of an aircraft effecting a blind landing.

Another object of the invention is to provide a system of presentation to the pilot of an aircraft, of necessary data and informations for a blind landing of the craft without the aid of a special glide path transmitter equipment.

The method according to the invention comprises more particularly the use of a cathode ray tube oscilloscope as means for indicating to a pilot several data or informations concerning a blind landing of an aircraft.

According to a feature of the invention the various data concerning a blind landing of an aircraft are presented to a pilot on a cathode ray tube oscilloscope by luminous signals occupying with respect to fixed reference lines or indexes, predetermined positions which are indicative of said data or informations.

According to another feature of the invention, said luminous signals provide on a single and same indicating dial, constituted by the screen of a cathode ray tube oscilloscope, the indications of deviations of the craft in direction and in altitude with respect to a desired glide path or landing trajectory as well as of a distance of the craft to a desired point of landing.

According to another feature of the invention, the indicating means materialize a predetermined relation between the distance which remains to be flown to a desired point of landing and the altitude at which the aircraft should be maintained at every moment so as to follow the desired glide path or landing trajectory.

According to a still further feature of the invention, the indicating means are established so as to provide a predetermined relationship between the distance remaining to be flown and the corresponding instantaneous flight altitude of the craft which must be maintained by the pilot in order to fly the craft along a desired glide path or landing trajectory and this without requiring the presence on the ground of a glide path transmitter equipment.

The invention is also characterized by the reduction to practice of the method specified above which consists in producing the specified indications of distance of the craft to a desired point of landing, by presenting to the pilot a luminous signal defining on a screen of a cathode ray tube oscilloscope a straight line segment of variable length constantly remaining parallel to itself and adapted to move laterally and vertically for indicating respectively deviations of the craft in direction and in altitude with respect to a desired glide path or a landing trajectory.

According to a still further object of the invention, in order to provide the indication of altitude at which an aircraft must be maintained in order to effect a blind landing following a prescribed or correct glide path or landing trajectory, it is suggested to bring the straight line segment forming indicating medium as defined in the preceding paragraph, in correlation with two curves traced or otherwise provided on the indicating dial or screen of a cathode ray tube, which curves translate a predetermined relation between the distance remaining to be flown and defined by the length of said segment and the altitude to be maintained at each moment and defined by the elevation of said segment above an horizontal line traced or otherwise provided on the same dial or screen and representing thereon the ground.

According to a still further object of this invention, these curves are traced symmetrically on either side of a vertical reference line also traced or otherwise provided on the indicating dial or screen, the lateral displacements of said segment to one or the other side of said vertical reference line defining deviations of the craft to one or the other side of the vertical plan the axis of a landing runway whilst a rising or a descent of the luminous points defining the extremities of said segments, out of coincidence with the above mentioned reference curves, defining deviations of the craft in altitude with respect to the altitude which the craft is required to maintain at every moment to follow a correct glide path or landing trajectory.

According to a further feature of the invention, the straight line segment providing the desired indication of guidance such as specified above is defined or materialized on a cathode ray tube screen by two horizontally aligned luminous points, the spacing of which one with respect to the other measures the distance remaining to be flown, these points moving together laterally and vertically for respectively indicating deviations of the craft in direction and in altitude with respect to a desired glide path or landing trajectory. The law of variation of spacing between said luminous points in relation to distance remaining to be flown may have any desired form. However, it may be interesting, and this constitutes another feature of the invention, to render the spacing between said points variable proportionally and in the same manner as the angle at which the pilot would see a given base line situated at a point with respect to which a distance is to be measured.

According to a still further feature of the invention, the luminous points serving as indicating medium are controlled in their vertical movement proportionally to the true altitude of the craft above the ground, the zero value of altitude being indexed by the line representing the ground. In this manner, the same indicating points may serve for indicating simultaneously the distance of the craft to a desired point of landing, the relative position of the craft with respect to a vertical plan containing the landing trajectory and finally the altitude of the craft above the ground.

Besides, vertical displacements of the two indicating points out of coincidence with the curves which these points must follow upon a correct landing, shows to the pilot deviations of the craft in altitude from a desired glide path or landing trajectory.

The apparatus such as specified above may be completed according to the invention by a third luminous point or an auxiliary point appearing on the vertical diameter of the cathode ray tube screen and the distance of which to the horizontal line provided on said screen and representing the ground, may be rendered proportional to a distance of the craft to a desired point of touch down of the craft on a prescribed runway. In such a case, the pilot is able to follow a correct landing trajectory by maintaining the three points horizontally alined and progressively descending toward the line indicating the ground, while the two extreme points, the spacing of which one to the other defines the distance to a desired point of landing, being maintained all time on the two curves traced on the screen of the cathode ray tube indicator as mentioned above.

It is also possible to control the vertical displacement of the two points in proportion to the distance to a desired point of touch down of the craft on a runway and that of the auxiliary or middle point by an altimeter and namely a radio electric altimeter. In such a case, in order to maintain the craft on a desired landing trajectory the pilot has to maintain the third point horizontally alined with the two extreme points descending following the two reference curves traced on the cathode ray tube screen and which may be called glide path curves.

Besides, the above indications may be completed by an indication of lateral inclination or altitude of the craft about its longitudinal axis by causing either the alinement of the indicating points or a line representing the ground, to undergo a lateral inclination in accordance with or in response to the banking of the craft and more particularly under the control of a gyroscopic artificial horizon.

The invention concerns also an improved method of blind landing of aircrafts which consists in producing on an aircraft indications of deviations of the craft with respect to a desired direction of landing, of distance of the craft to a desired point of landing, of flight altitude of the craft to be maintained as a function of distance remaining to be flown and of true altitude of the craft above the ground, in controlling the direction of flight of the craft towards the desired point of landing in accordance with said indications of directional deviations and in controlling the descent of the craft following a desired landing trajectory by maintaining a predetermined relation between said indications of flight altitude to be maintained and the true altitude of the craft or the distance remaining to be traveled to a desired point of landing.

The invention concerns also a reduction to practice of the specified method of blind landing by means of a single very high frequency radio beacon adapted to produce a directive beam of radiant energy caused to cooperate with a suitable receiving equipment on the craft for providing the indications of distance and of directional and altimetric guidance of the craft, which equipment may be completed by an absolute altimeter for introducing the indications of true altitude. The invention comprises also a reduction to practice of the above method by means of a V. H. F. radio beacon of a rotating beam type cooperating with a receiving equipment on the aircraft comprising at least two receiving aerials spaced apart a predetermined distance one from the other along a base line transversal to said craft.

The invention concerns furthermore certain particular arrangements or embodiments of the receiving equipments or devices to be carried in an aircraft as described in order to obtain or provide a desired presentation of necessary data and informations for guiding a craft during a blind landing as generally outlined hereinabove.

The above and other objects and features of the invention will appear more clearly from the following detailed description of certain embodiments of the invention and from the annexed drawings it being understood that these drawings are given for the purpose of illustration only and do not define in any way the limits of the scope of the invention.

Figure 2:
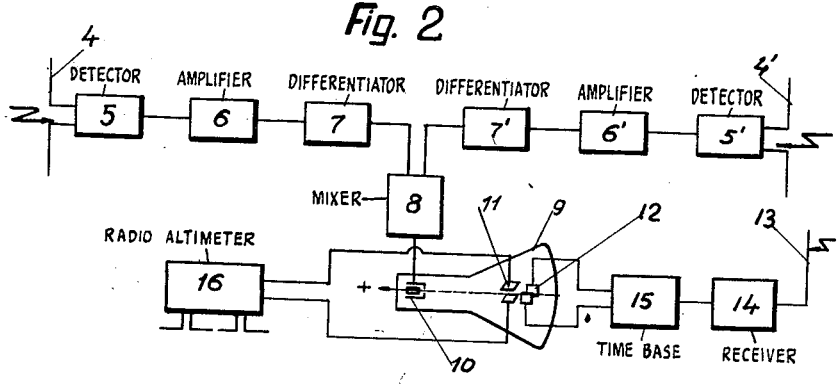

On the drawings:

Fig. 1 is a schematic representation of a blind land system according to the invention, Fig. 2 is a diagram of a form of embodiment of the indicating means according to the invention permitting to produce simultaneously an indication of the distance of the craft to a desired point of landing and indications of directional and altimetric guidance of the craft following a predetermined landing trajectory.

Figure 3:
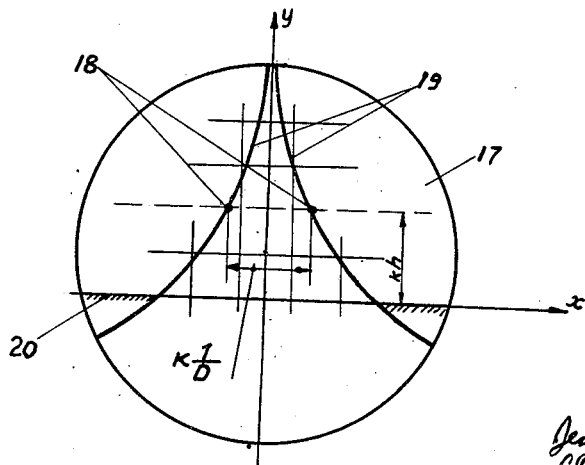
Figure 4:
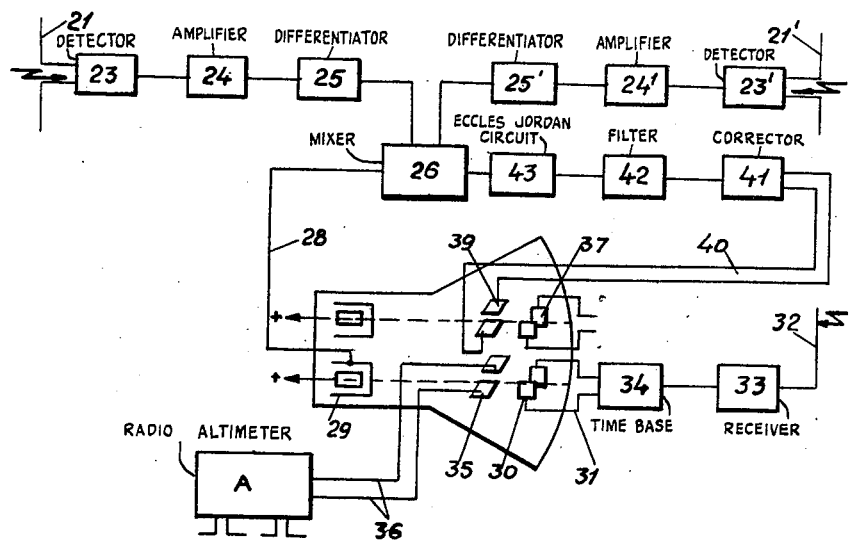

Fig. 3 gives a front view of a cathode ray tube screen used as indicating device in the equipment according to Fig. 2, Fig. 4 gives a diagram of another form of embodiment of indicating means using a cathode ray tube of a double ray type used in order to produce two luminous points serving for indication of the distance of the craft to a desired point of landing and for the directional and altitude guiding of the craft following a landing trajectory in correlation with a third point controlled in response to the distance to the desired point of landing for indicating the flight altitude at which the aircraft must be maintain to follow the desired landing point.

Figure 5:
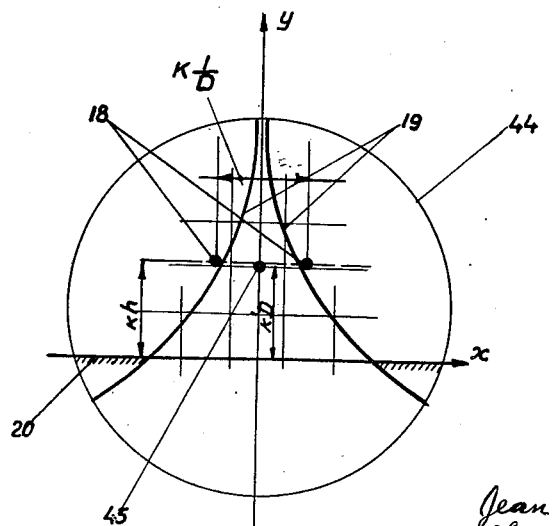
Figure 6:
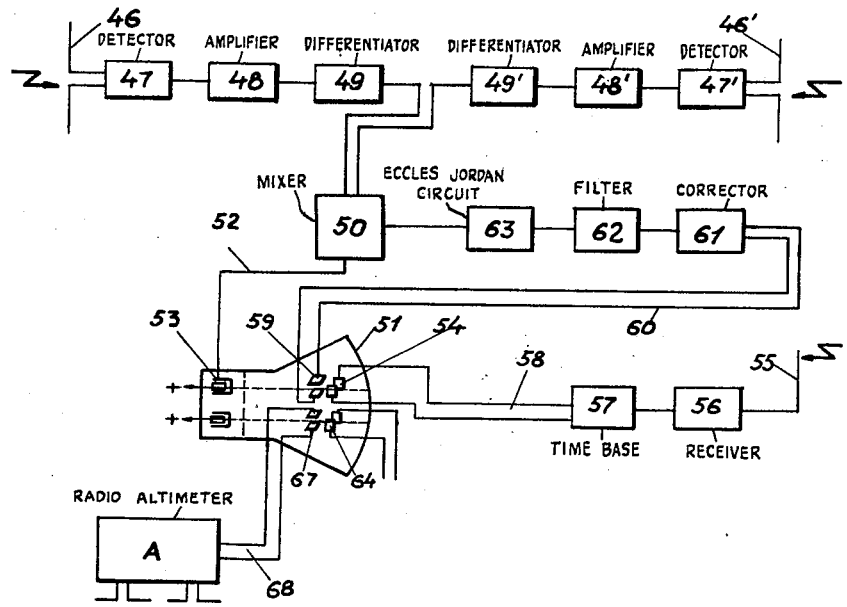
Figure 7:
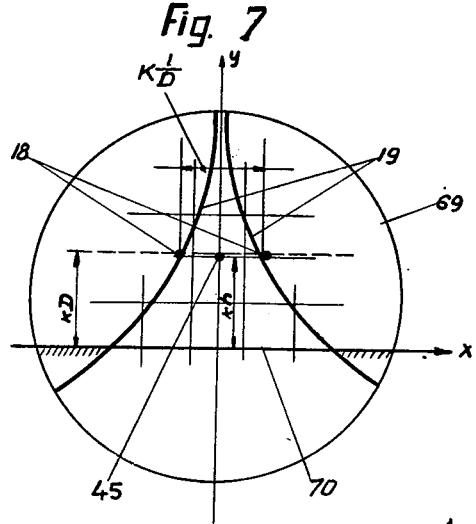
Figure 8:
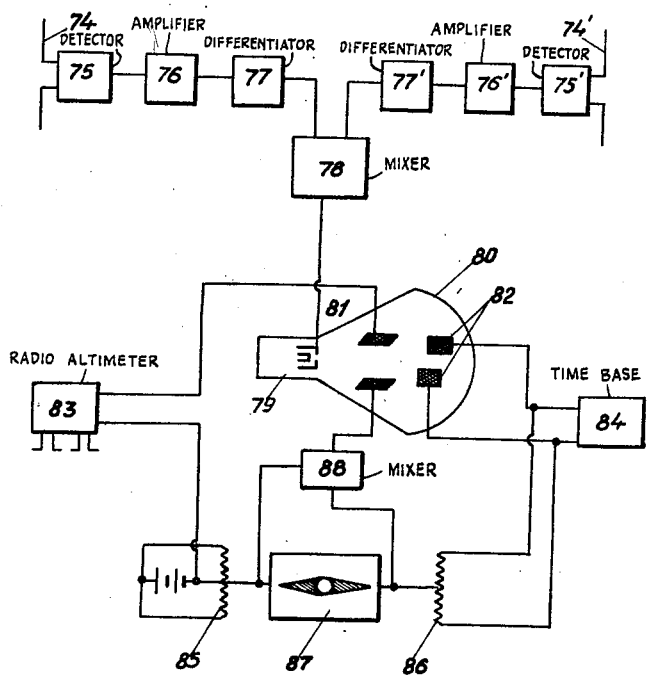
Figure 9:
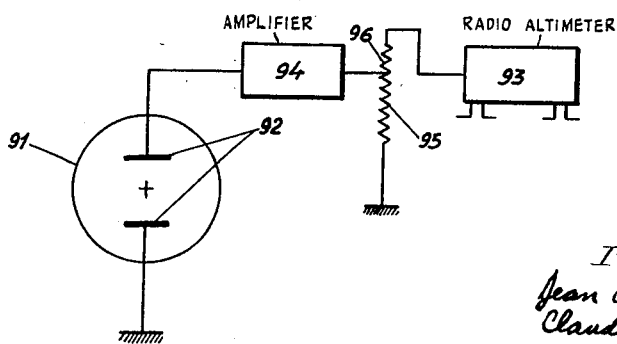

Fig. 5 is a front view of a cathode ray tube serving as an indicator in the equipment according to Fig. 4, Fig. 6 shows a third form of embodiment of the invention making use as previously of a cathode ray having two cathode rays and in which the luminous points produced by one of said rays serve to indicate the distance of the craft to a desired point of landing and to guide the craft in direction and in altitude with respect to the glide path in cooperation with a third luminous point controlled in response to the true altitude of the craft, Fig. 7 is a front view of the screen of the cathode ray tube serving as indicating means in the equipment according to Fig. 6, Fig. 8 shows a schematic diagram of an arrangement provided to introduce in the indicator constituted by a cathode ray tube an indication of the banking of the craft under the control of an artificial horizon or a similar instrument, Fig. 9 shows another accessory arrangement of the equipment consisting in a correcting device permitting to change the glide path to be followed by the craft upon a blind landing and this in order to take into account a change in the weight of the craft or the existence of a wind component following the landing direction, Figs. 10 to 13 show schematic diagrams of the arrangements which may be used in accordance with the invention to produce a desired presentation of data and informations necessary for blind landing of a craft by using any desired instruments adapted to provide the necessary indications in the form of current or voltage.

Referring now to Fig. 1 of the drawings there is shown in 1 an aircraft ready to land on a runway 2 of an airfield. At one extremity of the runway there is provided a very high frequency radio beacon 3 producing a directive beam of radio energy rotating in the azimuth at an uniform speed $\omega$. This radio beacon of a rotating beam type is associated with an auxiliary transmitter producing a brief non directional signal at the moment of passage of the axis of said beam by the axis of the landing runway or a direction making a predetermined angle with said axis. The aircraft 1 ready to land as indicated on Fig. 1 is provided at the opposite extremities of its wings with two receiving aerials 4 and 4'. These two aerials are respectively connected to two independent receivers shown in Fig. 2 or else they may be alternatively connected by means of a suitable switching arrangement to a signal receiver. The signals received by said two aerials at the moment of the passage of the beam on each of said aerials are used to produce on the screen of a cathode ray tube oscilloscope luminous signals preferably in the form of luminous points 18, as shown in Fig. 3 which serve as indicating means of various data and informations necessary for guiding a craft upon a blind landing.

According to the invention the receivers corresponding to two aerials 4 and 4' may comprise a detector 5, 5', an amplifier 6, 6' and a differentiator 7, 7' and they may be connected to Wehlnet cylinder 10 of a cathode ray tube indicated generally by a reference numeral 9. The horizontal deflection plates 12 of said cathode ray tube are connected to a time base device 1 controlled by the reference signal produced b the auxiliary transmitter at the moment of pass age of the beam by the direction of landing c preferably a direction making a certain angl with said direction of landing, this signal bein received on a special antenna 13 feeding a re ceiver 14 connected to said time base device 1 With this arrangement and as it has been ex plained in detail in the co-pending applicatio filed on September 2, 1948 under Serial No. 50,51 and entitled Distance Measuring Systems, th spacing between the two luminous points 18, 1 determined by the passage of the rotating bear of radiant energy by the two aerials 4, 4' pro vided at the opposite extremities of the wing of the craft 1, varies with the distance remainin to be flown to a desired point of landing, whil a simultaneous displacement of said two point in a lateral direction with respect to vertical di ameter of the cathode ray tube screen indicate deviations of the craft to one or to another di rection with respect to the vertical plan con taining the direction of landing.

According to the invention the law of varia tion of spacing between the two points 18 an the reflection of distance between the craft an the radio beacon is such that this spacing in creases in the same manner as the angle unde which a pilot would see a given base line situate at a point with respect to which the distance i to be measured. This particular feature of th arrangement is very advantageous as it permit to give to the pilot a neat sensation that he i approaching to the point of landing.

In view of the fact that, as the distance re maining to be flown to a desired point of landin, decreases, the altitude of the aircraft must b progressively reduced, it is suggested accordin to the invention to make the two luminous point movable in a vertical direction in response t the actual altitude of the craft and to trace o the cathode ray tube screen on either side o the vertical axis thereof, two symmetrical curve 19 showing or translating a relation between th distance to a desired point of landing and th altitude at which the craft must be maintaine to follow a desired glide path, curves which mus be followed by the two points 18 in order t keep the aircraft on said gliding path while fly ing towards the point of landing.

According to the invention the curves which must be followed by the luminous points as mentioned above are the arcs of hyperboles expressed by the following equation:

$$x(v+1K_2) = \pm K_1 K_2 \frac{d}{\omega D}$$

where:

$$x = \pm \frac{K_1 d}{\omega D}$$

and $$v = K_2(D-1)$$

in which:

$K_1$ and $K_2$ are two constant coefficients of proportionality $\omega$ is the angular speed of the rotating beam $d$ is the spacing between the two receiving aerials
$D$ is the distance to the radio-beacon, and
$l$ is the distance between the radio beacon and the desired point of landing.

In order to make luminous points 18 movable vertically in proportion to the true altitude, the vertical deflection plates 11 of the cathode ray tube 9, as shown on Fig. 2, are adapted to be controlled by an absolute altimeter 16.

The screen of a cathode ray tube arranged as specified above appears as shown in Fig. 3. On said figure, line 20 represents the ground and the vertical distance of the two luminous points 18 above said line is proportional to the altitude of the craft.

With the arrangement shown in Fig. 3 the two luminous points 18 are displaced to the left or to the right dependent on the deviation of the craft to the right or to the left of the vertical plan passing through the axis of the landing runway. Besides, the spacing between the two points 18 varies with the distance which remains to be flown. Finally the vertical position of said points with respect to the ground line 20 shows the altitude of the craft and their position with respect to two curves 19, 19' indicates the position of the craft in altitude with respect to a desired glide path. Thus, the pilot is able to judge upon a single look on the dial, deviations of the craft in direction, its distance to the desired point of landing and finally the deviations of the craft in altitude from the desired glide path.

According to a feature of the invention the device described above may be completed by a luminous point produced on the vertical diameter of the cathode ray tube screen and the distance of which, to the ground line 20, may be rendered proportional to the distance of the craft to a desired point of touchdown. For this purpose it is suggested according to the invention to use a cathode ray tube with two cathode rays one of which is used to produce the two extreme points and the other to produce the central luminous point movable along the vertical diameter of the cathode ray tube screen. This embodiment is shown on Fig. 4 and the corresponding aspect of the cathode ray tube screen is shown on Fig. 5.

As it is indicated in Fig. 5 the middle or reference point 45 movable following the vertical axis of the screen is controlled by the indication of distance which serves also to control the spacing between the two extreme luminous points 18 according to a predetermined relation between the distance of the craft to the desired point of landing, these points 18 being on the other hand controlled to move in the vertical direction in response to the true altitude of the craft. Under such conditions an ideal landing is perfected if the three points 18; 18 and 45 are constantly maintained in alignment. If the middle point 45 is below the two points of distance 18, the craft is above the desired glide path. If the middle point 45 is above said distance points 18, the craft is below the desired glide path. Furthermore the pilot must maintain the two extreme or distance points 18 at all time on the two curves 19 traced on the screen. Thus any deviations of the craft from ideal conditions of landing are immediately appearing and this much better than by appreciating by eyes the equality of spacing of the two points 18 to the vertical diameter of the screen.

The cathode ray tube in the form described above may be provided following the vertical diameter with a scale graduated in units of altitude to which will correspond the horizontal graduation lines whilst horizontally the screen may be provided with a scale graduated in units of distance.

Fig. 5 shows the screen of the tube used in the arrangement described with reference to Fig. 4, with three points aligned following a horizontal line and showing the craft in a correct position on the glide path.

The equipment which may be used to produce the above indications may comprise, as shown in Fig. 4, two receiving aerials 21, 21' which may be constituted by di-poles followed by receivers in all points similar to those shown in Fig. 2. These receivers comprise thus detectors 23, 23', amplifier 24, 24' and differentiators 25, 25', the outputs of said receivers being connected to a mixer 26. However, in such a case two separate circuits are provided at the output of mixer 26. One of said circuits connects directly the output of mixer 26 to Wehlnet 29 of one of the cathode rays of the cathode ray tube, the horizontal deflection plates 30 corresponding to said cathode ray being controlled by a time base device 34, itself controlled as previously by the reference signal received by an aerial 32 and a suitable receiver 33 the output of which is connected to said time base device 34. The vertical deflection plates 35 of the same cathode ray are controlled in such a case by an electrical altimeter A the output of which is connected to said plates by a conductor 36.

The second circuit at the output of mixer 26 is provided to control the vertical deflection plates 39 of the second cathode ray of the same tube producing the middle point 45. The horizontal deflection plates 37 of said cathode ray remain inoperative. The vertical deflection plates 39 are connected to the output of mixer 26 by the intermediary of a circuit comprising an Eccles-Jordan circuit 43, a filter 42 and a corrector 41 provided to render the vertical displacement of the middle point 45 proportional to the distance remaining to be flown whilst the filter circuit provides a hyperbolic relation. In this manner the elevation of the middle point 45 (Fig. 5) with respect to the ground line 20 is variable with the distance to the point of landing.

Referring now to Figs. 6 and 7, these figures show a modification of the invention in which the two points of distance 18 are moving vertically in accordance with the distance to the desired point of landing and provide indication of altitude to be maintained, to follow the desired glide path whilst the elevation of the middle point 45 above the ground line is made proportional to the actual altitude of the craft.

This modified embodiment of the invention comprises again the use of a cathode ray tube 51 with two cathode rays.

One of the cathode rays of said tube is used to produce the points of distance 18 and the other the middle point 45 indicating the actual altitude. As it is shown in Fig. 6, the control apparatus of the first cathode ray comprise two aerials such as di-poles 46 and 46', located as previously, at the extremities of the wings of an aircraft for instance. These aerials are followed by receivers which may comprise detectors 47, 47', amplifiers 48, 48' and differentiators 49, 49'. The outputs of said differentiators 49, 49' are connected to a mixer 50 having two output circuits 52 and 60. The first of said circuits is connected to a Wehlnet cylinder 53 of the corresponding cathode ray, the horizontal deflection plates 54 of which are controlled by the reference signal. Said reference signal is received by a suitable aerial 55 followed by a receiver 56 adapted to control the triggering of a time base device 57 acting on said horizontal deflection plates 54 to which it is connected by conductors 58. The equipment, as described above, operates substantially similarly to the previously described embodiment with two distance points 18 produced on the screen to provide the indication of distance remaining to be flown to a desired point of landing as well as indications of deviation of the craft with respect to the vertical plane containing the direction of landing.

According to the invention the vertical deflection plates 59 of this cathode ray producing the distance points 18, are controlled in accordance with the distance remaining to be flown to a desired point of landing, by the second output circuit 60 of mixer 50 including a circuit of the Eccles-Jordan type 63 followed by a filter 62 and a corrector 61. The output voltage of said corrector 61 is applied to said vertical deflection plates 59 for displacing the distance points 18 in proportion to the ideal altitude at which the craft must be maintained as a function of the distance which remains to be flown to the desired point of landing.

The second cathode ray forming the middle point is controlled only in the vertical sense and this, as previously indicated, in accordance with the true altitude of the craft. For this purpose no potential is applied to horizontal deflection plates 64, whilst a D. C. potential furnished by a radio-electric or in general an absolute altimeter A and to which is superposed a fixed bias potential acts upon the vertical deflection plates 67 of said cathode ray.

Thus, the indicating screen in this case appears as indicated in Fig. 7. The distance points 18 are movable vertically for indicating deviations from the ideal altitude which must be maintained to follow a correct glide path or landing trajectory and the middle point 45 shows the true altitude of the craft, the other parts of the display remaining the same.

In order to effect a correct landing the pilot should maintain the distance points 18 on the glide path curves 19 and maintain at all times a horizontal alignment of the two points 18 with the middle point 45.

It is understood that various modifications or alterations may be introduced in the described displays or representations of landing data and information without departing from the spirit of this invention for instance, in turns, the distance points may be maintained horizontally aligned with respect to the aircraft and the line representing the ground may be banked with respect to the craft in proportion to the bank angle of the aircraft. For this purpose, the line representing the ground may be constituted by a horizontal bar adapted to reproduce the banking of the craft under the action of a suitable control from a gyroscopic horizon for instance.

Besides, the two distance points may be joined by a luminous line defining on the screen of the cathode ray tube oscilloscope a straight line segment of a variable length depending on the distance remaining to be traveled and the extremities of which should lay on the glide path curves traced on the screen and indicating a correct descent of the craft along the desired landing trajectory. The controlling device used for controlling the vertical movement of the distance point or that of the middle point in proportion to distance will comprise preferably a coil instrument such as an amperemeter receiving a D. C. voltage measuring the distance remaining to be traveled and provided with an arm frictionally engaging a non linear resistance winding. A current passes through said variable resistance and follows thus a predetermined law in relation to the distance remaining to be traveled, in order to apply a desired potential on the vertical deflection plates of the corresponding cathode ray.

The horizontal deflection plates of the cathode ray corresponding to distance points may be biased by a potential proportional to deviation of the craft with respect to the vertical plan containing the direction of landing and on which is superposed by means of a condenser a periodic potential derived by a mechanical commutator from the D. C. potential serving for the indication of distance.

In the case the display of landing data includes the indication of lateral inclination or banking of the craft, there will be used preferably a magnetic deflection device. The deflecting coils of this device may be driven by a suitable follow-up control from a turn indicator or a gyroscopic horizon for reproducing said indication.

Figure 8 of the drawings shows an embodiment of a control arrangement which may be used in order to introduce into a display of blind landing data the above mentioned indication of bank angle of the craft. This indication is produced by controlling the angular position of the alignment of the two distance points from an artifical horizon. As shown on said figure the two receiving channels corresponding respectively to two spaced and independent aerials 74 and 74' provided at the extremities of the wings of an aircraft are connected to a mixer 78 which in its turn is connected to the Wehlnet or control electrode 79 of the cathode ray tube, indicated generally by the reference numeral 80. These receiving channels comprise detectors 75, 75', amplifiers 76, 76' and differentiators 77, 77'. The cathode ray tube 80 comprises vertical deflection plates 81 and horizontal deflection plates 82, the latter being controlled by a time base device 84 triggered by the reference signal whilst the former are controlled by an absolute altimeter such as 83, so that normally the two indicating points, the spacing of which corresponds to the distance of the craft to a desired point of landing, are movable vertically in accordance with the altitude of the craft and laterally in accordance with deviations of the said craft from the desired direction of landing.

In order to render said points capable to show a banking of the craft it is suggested, according to the invention, to connect in parallel on the horizontal sweep arrangement 84, a balance potentiometer such as 86, provided with a central tap movable in response to relative displacements of the artificial horizon 87 with respect to the craft about its longitudinal axis. The output potential of said potentiometer is equal to zero when the craft is not banked whilst this potential increases linearly with time during a sweep cycle in one or in another direction according to the direction of banking of the craft. The potential picked up by the movable tap of the potentiometer 86 is transmitted to a mixer 88 in which it is superposed on the output potential of altimeter 83 to act upon the vertical deflection plates 81 of the oscilloscope. Such an arrangement is effective to cause a lateral inclination in a correct direction of the line joining the two distance points but the indication of altitude when the two points are equally spaced from the vertical diameter of the tube is rendered incorrect. In order to compensate this error it is suggested to cause the artificial horizon 87 to control a second potentiometric system 85 opposed to the first and fed from a D. C. source of electrical energy, isolated from ground and having a value equal to the half of the peak value of the horizontal sweep voltage. This potential is introduced in series with that produced by altimeter 83 and has a reverse polarity with respect to the alternating signal produced by potentiometer 86 connected in parallel on the circuit.

It is understood that various changes may be introduced in the above arrangement to suit the requirements. Thus potentiometer 86 fed by the horizontal sweep generator 84, may be replaced by an alternating potential capacitive pick up system, which may be constituted by two condensers mounted in opposition and having a common armature or plate of an angularly variable position adapted to be controlled by an artificial horizon and the opposite plates of which are fed in opposition by the output conductors of the symmetrical sweep generator 84. The compensating D. C. voltage supplied by potentiometer 85 may be obtained from the sweep circuit by means of a rectifier. It may be also derived from the output potential of mixer 88 after a change of impedance in a tube a rectification and a filtering.

Besides in case a display of blind landing data or information such as specified above is obtained from a transmitter-receiver equipment or system other than that previously described and when the sweep period is no more small in comparison with the recurrence sweep period, the above compensator device may be suppressed.

The invention concerns also the provision in the data display system such as described above of correcting devices permitting to alter the presentation of indications so as to adjust or modify the glide path to be followed by an aircraft upon a blind landing, in order to allow for any desired factor which must be taken into account and namely the weight of the craft or the wind component directed following the axis of the landing runway.

In fact, if there exists upon a landing a head wind, the slope with respect to the ground of the landing trajectory to be followed by the craft should be increased, the slope with respect to the wind remaining unchanged or in other words for a given distance to the desired point of landing the actual altitude of the craft should be increased.

In order to introduce such a correction in the data display arrangement such as described hereinabove it is necessary thus to cause, for a given indication of distance, a variation of the deviation of the indicating point or points indicating the altitude to be maintained for following a desired glide path.

According to this invention this result may be obtained by providing a regulating arrangement permitting to adjust the value of a controlling potential or current applied, under the action of an absolute altimeter, to the vertical deflection device of the cathode ray tube corresponding to the points or a point controlled in accordance with altitude. These means may take different form, but an extremely simple solution is obtained as shown in Fig. 9 by providing in the control channel of the vertical deflection device and namely of the vertical deflection plates 92 of the oscilloscope 91 corresponding to the indication of altitude, from absolute altimeter 93, a potentiometer 95, 96 permitting the regulation of the gain of an amplifier 94 acting on said vertical deflection plates 92 of the cathode ray tube. This potentiometer will be adjusted so as to reduce or to increase the gain of the above amplifier according to the intensity of the wind or more exactly of the wind component following the axis of landing and directed against the movement of the craft. This gain may be also controlled in accordance with gross weight of the craft or its load.

It is understood thus that the suggested regulating arrangement permits to introduce into the system any desired factor or data in order to modify the inclination or the shape of the landing trajectory.

In the preceding description the necessary indications for a display of blind landing data such as described hereinabove have been obtained from a reception on two spaced and independent aerials, provided on the craft such as an aircraft, of signals produced by a radio beacon of a rotating beam type and more particularly.

However said indications may be obtained by other systems or means without departing from the spirit of the invention and in this respect the invention contemplates furthermore the provision of suitable arrangements or devices whereby a same display of blind landing data as described hereinabove may be produced or derived from a system different from that mentioned above, i. e. that making use of a rotating beam of radiant energy which is adapted to cooperate with two spaced and independent aerials. More particularly the invention contemplates the provision of means whereby such a display of blind landing data may be obtained from or in association with any system or apparatus capable of developing the necessary signals for the production of such indications under the form of electrical potentials or currents.

The invention provides thus arrangements whereby said display of blind landing data may be produced by using electrical signals measuring or representing the following factors: lateral deviation of the craft with respect to the vertical plan containing the axis of a landing runway; distance between the craft and the desired point of landing; vertical deviation of the craft with respect to a plan perpendicular to the plan containing the axis of landing and intersecting said plan following the desired landing trajectory; and eventually instead of said vertical deviation, altitude of the craft above the ground.

There will be described by way of example two embodiments of this aspect of the invention in which displays such as described in connection with Figures 3 and 5 are derived from electrical signals in the form of D. C. potentials respectively proportional to the lateral angular deviation of the craft with respect to the vertical plan containing the axis of landing, the distance separating the craft from a desired point of landing and the vertical deviation of the craft from a desired glide path defined by the intersection of the vertical plane containing the direction of landing and a plane perpendicular to said vertical plane and inclined with respect to the ground by a predetermined glide angle.

In two further embodiments, displays such as shown in Fig. 7 are obtained from electrical signals in the form of D. C. potentials respectively proportional to the lateral angular deviation of the craft from the plane containing the direction of landing, the distance separating the craft from the desired point of landing and the altitude of the craft above the ground.

In a first of said embodiments it is assumed that a given transmitter-receiver system produces the following signals: an electrical D. C. potential U proportional to lateral angular deviations of the craft with respect to the vertical plane containing the axis of a landing runway, the angle being measured about a vertical passing through a fixed point on said axis; an electrical D. C. potential V proportional to the distance of the craft to a desired point of landing; an electrical D. C. potential W proportional to vertical angular deviations of the craft with respect to a plan perpendicular to the vertical plan containing the axis of landing and defining by its intersection with the first plan an ideal rectilinear glide path, the deviations being measured about the line of intersection of said second plan with the ground.

In this first example the display obtained will be that shown in Figure 3.

Figure 10 shows schematically the arrangement which may be used for this purpose. There are indicated in 101, 102 and 103 respectively, the apparatus providing the controlling potentials U, V and W. The time base device 104 provides a saw-tooth sweep voltage B which is applied between the horizontal deflection plates 105 and 106 of the oscilloscope, not shown, in such a manner that the cathode spot is positioned to the left of the screen when said sweep voltage B is minimum and towards the right of said screen when said sweep voltage is maximum. The value of sweep voltage B in the middle of one sweep is nil. On the other hand potential V proportional to the distance is applied to a corrector circuit which provides at its output a potential V′ reversely proportional to said distance. The potentials U and V′ are applied to a summing circuit 108 and to a subtracting circuit 109 so that at the output of circuit 108 there appears a potential $U+V'$ and at the output of circuit 109 there appears a potential $U-V'$.

The potential $U+V'$ is applied to a triggering circuit 110 which receives at the same time the variable sweep potential B produced by the time base device 104. Circuit 110 is constituted so as to provide a pulse of a short duration, when potential B passes through the value $U+V'$. This pulse is used for unlocking during an instant the Wehnelt or control electrode 110 of the oscilloscope.

In the same manner the potential $U-V'$ is applied to a triggering circuit 111 similar to circuit 110 and which receives at the same time the variable sweep voltage B and provides a pulse of a short duration applied to the Wehnelt 112 when potential B passes by the value $U-V'$.

Besides, potential V and potential W are combined in a circuit 113 so that at the output of this latter there is obtained a potential E proportional to the actual altitude of the craft. This actual altitude of the craft is equal to the sum of the ideal altitude, itself proportional to the distance, that is to V and to a term proportional at the same time to V and W. This potential is applied between the vertical plates 114 and 115 of the oscilloscope.

In this manner there is provided during each sweep of the oscilloscope two spots or luminous points which present the following characteristics: the midway point between said points has an abscissa proportional to U, that is to the lateral deviation; the common ordinate is proportional to E, that is to the actual altitude of the craft whilst, the spacing between the two points is proportional to V′ that is reversely proportional to the distance remaining to be travelled to a desired point of landing.

If said points are on two curves provided on the oscilloscope screen and expressing a predetermined altitude-distance relation, as previously explained, the aircraft is following the correct glide path or landing trajectory.

In the second example of a similar equipment there are used the same signals U, V and W but it is assumed that it is desired to obtain a display with three points as shown in Figure 5.

Figure 11 shows schematically an arrangement which may be used in such a case. This arrangement differs from that previously described only by the provision of a sufficiently fast operating two position commutator 116. This commutator 116 in its first position provides connections whereby: between the horizontal deflection plates 105 and 106 of the oscilloscope there is applied sweep voltage B produced by the time base device 104; between the vertical deflection plates 114 and 115 there is applied potential V produced by apparatus 102 proportionally to the distance of the craft to a desired point of landing and therefore to the ideal altitude; to Wehnelt 112 there are applied short time pulses produced by trigger circuits 110 and 111.

In its second position commutator 116 provides connections whereby: the horizontal deflection plates 105 and 106 are connected to a same potential between the vertical deflection plates 114 and 115 there is applied potential E produced by circuit 113 and proportional to the true altitude of the craft which unlocks said electrode.

Consequently in the first position of commutator 116 the two luminous points present the following characteristics: the midway point of the straight line segments defined by said luminous points has an abscissa proportional to potential U, that is to the directional deviation of the craft; the common ordinate of said points is proportional to potential V, that is to the ideal altitude of the craft; the spacing between the points is proportional to potential V′, that is reversely proportional to the distance remaining to be travelled to a desired point of landing.

When commutator 116 is in its second position a luminous point appears on the vertical diameter of the tube and the ordinate of said point is proportional to the actual altitude of the craft. If the commutator is sufficiently fast three luminous points appear simultaneously and their alignment taken in conjunction with the symmetry of the two first points with respect to the third one, indicates whether or not the aircraft follows the described glide path.

It is appearing that, by reversing the connections of conductors F1 and F2 on the commutator 116 which introduce voltages V and E, there is obtained a similar display or presentation of indications except that the ordinate of the two first luminous points is proportional to the actual altitude of the craft and that of the third point to the altitude to be maintained to follow the glide path.

In the third example of embodiment of the equipment of said type it is assumed that a transmitter-receiver system is used which provides the following signals: an electrical potential U proportional to the angular deflection of the craft with respect to the vertical plan containing the axis of landing, this angle being measured about the vertical passing through a fixed point on said axis; an electrical D. C. potential V proportional to the distance between the craft and the desired point of landing and finally an electrical D. C. potential X proportional to the altitude of the craft above the ground.

It will be assumed that it is desired to obtain a display by two points as shown in Figure 5. The arrangement which may be used for this purpose is shown in Figure 12. The diagram and the operation of said arrangement are similar to those of the first example except for the following differences:

There are shown in 101, 102 and 117 respectively the apparatus providing control or signal potentials U, V and X. The potential X is directly applied to the vertical deflection plates 114 and 115 of the oscilloscope. The combination circuit 113 is eliminated. It results, that during each sweep of the oscilloscope there are produced two luminous points having the same significance as in the first example.

Finally in the fourth example of embodiment of a similar equipment the same signals U, V and X as in the third example are supposed to be available but in this case the form of display of indications to be obtained is supposed to be that by three luminous points as shown in Figure 7. The arrangement which may be used for this purpose is shown in Figure 13. The diagram and the operation of this arrangement are the same as those of the second example given hereinabove with the following differences:

There are shown in 101, 102 and 117 respectively the apparatus adapted to provide controlling potentials U, V and X.

The arrangement comprises as in the second example a two position commutator 116 which is adapted in its second position to apply directly a potential X produced by the apparatus 117 between the vertical deflection plates 14 and 15 of the oscilloscope. The combination circuit 113 is eliminated. As a result there are obtained on the cathode screen three luminous points having the same significance as that in the second example hereinabove.

It appears that, by reversing connections of conductors F1 and F2 on commutator 116, conductors which bring in potentials V and X, there may be obtained a same representation as previously except that the ordinate of the two distance points is proportional to the actual altitude of the craft and that at the third point is proportional to the ideal altitude to be maintained to follow a desired glide path.

The invention provides thus an improved method of presentation to or of displaying before a pilot of an aircraft the data and indications which must be furnished to him to permit him to effect a blind landing, these data being obtained by radio-electric means.

According to the proposed method, several data or indications are associated on a same and single dial and namely a screen of a cathode ray tube and are displayed by the same indicating means formed by luminous signals of the cathode ray tube. These data or informations comprise: the distance remaining to be traveled, indicated by the spacing of the two points or the length of a straight line segment, the correct position of the craft with respect to the vertical plan, indicated by the symmetry of said points or of said straight line segment with respect to the vertical diameter of the screen and finally, the maintainance of a correct altitude of the craft in order to effect the landing following a desired trajectory by properly correlating the indications of distance and altitude.

The invention provides also an improved indicating arrangement or device permitting to the pilot of an aircraft to effect a correct descent following a desired landing trajectory without the use of any other provisions or means than the device permitting to measure the distance remaining to be flown to the desired point of landing, the correct descent of the craft being characterized by the movement of the distance points along the two glide path curves traced on the cathode ray tube screen. The movement of the distance points may be controlled either in accordance with said distance remaining to be flown or traveled or in accordance with the true altitude of the craft, it being understood that in the first case the pilot should establish a correlation between the indications of distance points with those of the altimeter carried by the craft.

The invention provides on the other hand an improved method of guiding an aircraft upon or during a blind landing along a predetermined trajectory both in relation to the direction and the altitude, the guiding in altitude being effected by referring to the indication of distance remaining to be flown to a desired point of landing, produced on the craft.

It is understood that the invention is not limited to the forms of embodiment specifically described and illustrated and that various changes or modifications evident to men skilled in the art may be introduced into said embodiments without departing from the spirit of the invention.

We claim:

1. An indicating arrangement for presenting to a pilot of an aircraft data or indications necessary for effecting a blind landing, comprising means for measuring the distance of the craft to a desired point of landing, means for measuring positional deviations of the craft from a desired direction of landing, means for measuring the altitude of the craft above the ground, a cathode ray tube oscilloscope, means for indicating on its screen a predetermined relation between the distance of the craft to a desired point of landing and the altitude at which the craft must be maintained at every moment as a function of said distance defining a predetermined glide path, means for controlling said oscilloscope from said distance measuring means to produce on the screen of said oscilloscope two horizontally aligned spaced points, the spacing of which varies as a function of distance, means for controlling said oscilloscope from said directional deviation measuring means for moving laterally said points to show said directional deviations and means for controlling said oscilloscope from said altitude measuring means to move vertically said points to show variations of altitude of the craft above the ground.

2. An indicating device according to claim 1 in which means are provided to produce on the screen of said oscilloscope a second luminous signal in the form of a third point movable vertically as a function of distance remaining to be travelled.

3. An indicating arrangement according to claim 2 comprising a double beam cathode ray tube, means associated therewith for controlling one of its beams to provide the luminous signal in the form of two spaced points and means for controlling its other beam to provide the second signal in the form of a third luminous point.

4. An indicating arrangement for presenting to a pilot of an aircraft data or indications necessary for effecting a blind landing, comprising means for measuring the distance of the craft to a desired point of landing, means for measuring deviations of the craft from a desired direction of landing, means for measuring the altitude of the craft above the ground, a cathode ray tube oscilloscope, means for controlling said oscilloscope from said distance measuring means to produce on the screen of said oscilloscope two horizontally aligned spaced points, the spacing of which varies as a function of distance, means for controlling said oscilloscope from said directional deviation measuring means for moving laterally said points to show said directional deviations, means for controlling said oscilloscope from said distance measuring means for causing vertical movement of said points to show the altitude to be maintained by the craft, as a function of said distance, to follow a predetermined glide path and means for producing on the same screen a third point movable vertically in response to the actual altitude of the craft above the ground.

5. An indicating arrangement according to claim 4 comprising a double beam cathode ray oscilloscope, means for controlling one of said beams from said distance measuring means to produce said luminous signal in the form of two luminous points which are both variably spaced, vertically movable as a function of distance and means for controlling the other of said beams from said altitude measuring means for producing on the same screen said second luminous signal in the form of a third point vertically movable as a function of actual altitude of the craft.

6. A system for presenting to a pilot of an aircraft data or indications for guiding thereof in a blind landing comprising a radiant energy transmitter equipment at the landing area producing a beam of radiant energy performing a periodical angular movement in azimuth in relation to a desired direction of landing and a receiving equipment on the aircraft including two spaced and independent aerials adapted for cooperation with a rotating beam of radiant energy to provide a measure of distance of the craft to a desired point of landing and a measure of deviations of the craft from a desired direction of landing, means for measuring the altitude of the craft above the ground, a cathode ray tube oscilloscope and means for controlling said oscilloscope in response to said measures to provide on said screen a single visible signal movable to provide simultaneously indications of distance, directional deviation and altitude of the craft.

7. A system according to claim 6 in which said receiving equipment comprises in association with said two spaced aerials and oscilloscope means for producing time spaced pulses indexing the passages of said beam by said two aerials, means for applying said pulses to said oscilloscope to produce on the screen thereof two spaced points the spacing of which measures the distance of the craft to a desired point of landing, means for receiving a reference signal produced at the landing area upon the passage of said beam by a predetermined position related to a desired direction of landing, means for controlling the application of said time spaced pulses to said oscilloscope as a function of time spacing thereof with respect to said reference signal, to produce lateral displacements of said signal points in accordance with deviations of the craft from said desired direction of landing, means for producing on the screen of the oscilloscope an indication of altitude to be maintained by the craft as a function of distance remaining to be followed, means for measuring the altitude of the craft above the ground and means for controlling said oscilloscope in response to said last measure for vertically moving said indicating points to show variations of the altitude of the craft above the ground correlated with said indication of correct altitude to be maintained by the craft.

8. A system according to claim 7 in which said indication of correct altitude is produced by a second luminous signal in the form of a third point on the same screen, said oscilloscope being associated with control means for moving said point following a vertical direction as a function of distance remaining to be travelled.

9. A system according to claim 8 in which said indication of correct altitude is given by indicia on the screen of the oscilloscope in the form of curves disposed symmetrically on either side of a vertical reference line, the horizontal spacing of said curves representing the desired relation between distance and altitude.

10. A system according to claim 6 in which said receiving equipment comprises means for producing time spaced pulses indexing the passages of said beam by said two spaced aerials, means for applying said pulses to said oscilloscope to produce on the screen thereof two spaced points the spacing of which measures the distance of the craft to a desired point of landing, means for receiving a reference signal produced on the ground upon the passage of said beam by a predetermined position related to the desired direction of landing, means for controlling the application of said time spaced pulses to said oscilloscope as a function of time spacing thereof with respect to said reference signal to produce lateral displacements of said signal points in accordance with deviations of the craft from said desired direction of landing, means for measuring the time spacing between said pulses, means controlling said oscilloscope in response to said last measure for vertically moving said indicating points to show the altitude to be maintained by the craft as a function of its distance in order to follow a desired landing trajectory and means for producing on the same screen a third point movable vertically in response to the actual altitude of the craft above the ground.

11. A system for presenting to a pilot of an aircraft data or indications for guiding thereof in a blind landing comprising radiant energy transmitting means at the landing area producing a beam of radiant energy defining in direction and in elevation a predetermined glide path and a receiving equipment on the aircraft comprising means for measuring lateral and vertical deviations of the craft from said glide path, means for measuring the distance of the craft to a desired point of landing, a cathode ray oscilloscope and means for controlling said oscilloscope from said different measuring means to produce on its screen a single luminous signal representing a segment of straight line having its length variable as a function of distance of the craft to the desired point of landing and movable parallelly to itself horizontally and vertically to indicate the position of the craft with respect to the vertical plane of the glide path and the altitude of the craft above the ground correlated with an indication of correct altitude to be maintained as a function of distance.

12. A system according to claim 11 comprising means for deriving from said distance measuring means a control factor proportional to the altitude to be maintained by the craft as defined by said glide path, means for combining said control factor with said measure of vertical deviation of the craft from the glide path and means for applying a resultant control factor to said oscilloscope for controlling the vertical movement of said single luminous signal.

13. A system according to claim 11 comprising means providing a D. C. potential measuring the distance of the craft to a desired point of landing, means providing a D. C. potential measuring deviations of the craft from a desired direction of landing, means for combining D. C. potentials providing respectively said measures of distance and of directional deviations of the craft to produce time spaced pulses and means to apply said pulses to the control electrode of said oscilloscope tube to produce on the screen of said tube a luminous signal in the form of two luminous points spaced apart by a distance reversely proportional to the distance of the craft to a desired point of landing and movable laterally as a whole in accordance with lateral deviations of the craft from a desired direction of landing.

14. A system according to claim 13 in which D. C. potentials measuring directional deviations of the craft and its distance to a desired point of landing are added up and substracted at the input of two trigger circuits fed on the other hand by a horizontal sweep generator of the cathode ray tube oscilloscope, said trigger circuits being connected to the control electrode of said tube to apply thereto control pulses when said sweep voltage passes through values corresponding to the sum and the difference of said D. C. potentials.

15. A system according to claim 13 comprising means providing a D. C. potential measuring the altitude of the craft above the ground and means for applying said potential to said oscilloscope for controlling vertical movement of the indicating points.

16. A system according to claim 14 in which a D. C. potential giving a measure of deviations of the craft in altitude from a desired glide path is combined with a D. C. potential giving the measure of distance to provide a combined potential giving a measure of the altitude of the craft above the ground, said combined potential being applied to a vertical deflection arrangement of the tube to control vertical movement of distance points or the middle point.

17. A system according to claim 13 comprising means providing a D. C. potential measuring the altitude of the craft above the ground, means for applying said potential to said oscilloscope for controlling vertical movement of said indicating points and commutator means for alternately applying to said oscilloscope a D. C. potential proportional to the measure of distance while suppressing the other potentials for producing a third point movable vertically in accordance with the altitude to be maintained by the craft.

18. A system according to claim 13 comprising means for applying said distance measuring D. C. potential to said oscilloscope for controlling vertical movement of said indicating points and commutator means for alternately applying to said oscilloscope a D. C. potential proportional to a measure of altitude above the ground while suppressing the other controlling potentials to produce a third point movable vertically in accordance with the actual altitude of the craft.

19. A system according to claim 13 comprising means for producing with the same cathode beam a third indicating point movable vertically in accordance with the altitude to be maintained by the craft as a function of distance of the craft to a desired point of landing.

20. A system according to claim 13 comprising means for applying said distance measuring D. C. potential to said oscilloscope for controlling vertical movement of said indicating points and means for producing with the same cathode beam a third indicating point movable vertically in accordance with the altitude of the craft above the ground.

21. A system according to claim 13 comprising means for controlling said oscilloscope from said altitude measuring means and said distance measuring means to correlate vertical movement of said distance points with that of a third middle point to guide the craft following a predetermined glide path.

22. A system according to claim 21 in which a high speed commutator assembly is used between the control element of a cathode ray tube oscilloscope and the control arrangements giving the measures of desired factors, said commutator assembly being adapted to connect said control elements to said control arrangements in one position so as to produce the two distance points and in another position so as to produce the middle point whereby a single beam cathode ray tube oscilloscope is used to provide a three point display.

23. An indicating arrangement for presenting to a pilot of an aircraft data or indications necessary for effecting a blind landing of the craft comprising means for measuring the distance of the craft to a desired point of landing, means for measuring deviations of the craft from a desired direction of landing, means for measuring the altitude of the craft above the ground, a cathode ray tube oscilloscope, means for controlling said oscilloscope from said distance measuring means to produce on the screen of said oscilloscope a single luminous signal in the form of two horizontally aligned spaced points, the spacing of which varies as a function of distance, means for controlling said oscilloscope from said directional deviation measuring means for moving laterally said points to show said directional deviations, means for controlling said oscilloscope from said altitude measuring means to move vertically said points to show variations of altitude of the craft above the ground, and means for controlling the line of alignment of the two distance points from an artificial horizon to introduce into said presentation lateral inclination of the craft by moving angularly said line of alignment with respect to a horizontal reference line.

24. An indicating arrangement according to claim 23 in which the control of the lateral inclination of the alignment of the distance points is obtained by applying to the vertical deflection plates of the cathode ray tube producing said points a control voltage of a variable phase and value controlled by the artificial horizon and synchronized with that of the horizontal sweep of the tube.

25. An indicating arrangement according to claim 23 in which the indication of lateral inclination is produced by a potential derived from the voltage of a horizontal sweep generator of the tube.

26. An indicating arrangement according to claim 23 in which the indication of lateral inclination of the craft is produced by a potential derived from the horizontal sweep generator by means of a symmetrical potential pick up device connected in parallel on the horizontal sweep circuit and the moving element of which is controlled in accordance with the relative displacement of the craft with respect to the artificial horizon about its longitudinal axis.

27. An indicating arrangement according to claim 23 in which the indication of lateral inclination of the craft is produced by a potential derived from the horizontal sweep voltage of the tube by means of a voltage pick up device devised so that the output potential thereof is nil when the craft is not banked and increases linearly with time during a sweep cycle in one or in the other sense according to the inclination of the craft.

28. An indicating arrangement according to claim 23 in which the indication of lateral inclination of the craft is produced by superposing a control potential responsive to said inclination on a variable voltage normally acting on the vertical deflection plates of the tube.

29. An indicating arrangement according to claim 23 in which the indication of lateral inclination of the craft is produced by superposing a control potential responsive to said inclination on a variable voltage normally acting on the vertical deflection plates of the tube and a compensating device also actuated by the artificial horizon introduces in series with the control voltage normally acting on said vertical deflection plates of the tube, a D. C. potential equal to a half peak value of the horizontal sweep voltage of the tube and having a polarity opposite to that of the signal derived from the horizontal sweep generator.

30. An indicating arrangement for presenting to a pilot of an aircraft data or indications necessary for effecting a blind landing, comprising means for measuring the distance of the craft to a desired point of landing, means for measuring deviations of the craft from a desired direction of landing, means for measuring the altitude of the craft above the ground, a cathode ray tube oscilloscope, means for controlling said oscilloscope from said different measuring means to provide on the screen of said oscilloscope a single visible signal movable to provide simultaneously indications of said distance directional deviations and altitude of the craft, referred to an indication of a predetermined relation between the distance of the craft to a desired point of landing and the altitude at which the craft must be maintained as a function of said distance to follow a predetermined glide path, and means for adjusting or regulating the indication of the glide path to be followed by the craft so as to allow for factors such as weight of the craft or head wind during a landing.

31. An indicating arrangement for presenting to a pilot of an aircraft data or indications necessary for effecting a blind landing, comprising means for measuring the distance of the craft to a desired point of landing, means for measuring deviations of the craft from a desired direction of landing, means for measuring the altitude of the craft above the ground, a cathode ray tube oscilloscope, means for controlling said oscilloscope from said distance measuring means to produce on the screen of said oscilloscope a single visible signal in the form of two horizontally aligned spaced points, the spacing of which varies as a function of distance, means for controlling said oscilloscope from said directional deviation measuring means for moving laterally said points to show said directional deviations, means for controlling said oscilloscope from said altitude measuring means to move vertically said points to show variations of altitude of the craft above the ground, and means for varying for a given indication of distance, the position of the indicating points to adjust or regulate the glide path to be followed by the craft so as to allow for factors such as weight of the craft or head wind during a landing.

32. An indicating arrangement according to claim 31 in which said correction is produced with the aid of means permitting to adjust the intensity of potential or current applied under the action of an absolute altimeter to the vertical deflection plates of the oscilloscope corresponding to the point or points indicating altitude.

References Cited in the file of this patent

UNITED STATES PATENTS

| Number | Name | Date |
| --- | --- | --- |
| 2,248,215 | Budenbom | July 8, 1941 |
| 2,396,112 | Morgan | Mar. 5, 1946 |
| 2,400,232 | Hall | May 14, 1946 |
| 2,405,231 | Newhouse | Aug. 6, 1946 |
| 2,423,104 | Labin | July 1, 1947 |
| 2,433,283 | Luck | Dec. 23, 1947 |
| 2,459,481 | Wolff | Jan. 18, 1949 |
| 2,459,482 | Bond | Jan. 18, 1949 |
| 2,463,529 | Ferrill | Mar. 8, 1949 |
| 2,490,306 | Jones | Dec. 6, 1949 |
| 2,502,974 | McElhannon | Apr. 4, 1950 |